United States Patent [19]

Riley

[11] Patent Number: 4,838,104
[45] Date of Patent: * Jun. 13, 1989

[54] CENTER MOUNTED AND CENTER DRIVE HELICAL SPLINE ACTUATOR

[75] Inventor: Thomas N. Riley, Portage, Mich.

[73] Assignee: Pneumo Abex Corporation, Boston, Mass.

[ * ] Notice: The portion of the term of this patent subsequent to May 24, 2005 has been disclaimed.

[21] Appl. No.: 83,029

[22] Filed: Aug. 7, 1987

[51] Int. Cl.$^4$ ............................................. F16H 25/18
[52] U.S. Cl. ...................................... 74/99 R; 92/31; 92/33; 144/78; 144/213
[58] Field of Search ................. 74/99 A, 99 R; 92/31, 92/33; 244/78, 213

[56] References Cited

U.S. PATENT DOCUMENTS

| | | | |
|---|---|---|---|
| 2,743,618 | 5/1956 | Watson et al. | 74/99 R |
| 3,056,386 | 10/1962 | Aarvold et al. | 92/33 |
| 3,141,387 | 7/1964 | Geyer | 92/33 |
| 3,187,592 | 6/1965 | Geyer | 92/33 |
| 3,530,769 | 9/1970 | Gurevich | 92/31 |
| 3,731,546 | 5/1973 | MacDonald | 74/63 |
| 4,738,415 | 4/1988 | Weyer | 244/78 |
| 4,745,847 | 5/1988 | Voss | 92/33 |

FOREIGN PATENT DOCUMENTS

81/01440  5/1981  PCT Int'l Appl. ..................... 92/33

OTHER PUBLICATIONS

"Power Hinge Battens the Hatches", *Machine Design*, Feb. 6, 1969, vol. 41, No. 3, p. 131.

Primary Examiner—Leslie A. Braun
Assistant Examiner—Scott Anchell
Attorney, Agent, or Firm—Renner, Otto, Boisselle & Sklar

[57] ABSTRACT

Helical spline actuator includes a pair of cylinder housings connected together in end-to-end spaced apart aligned relationship by means of a center mount. A shaft is mounted for rotation within the two housings, and has a rotatable drive member extending outwardly therefrom between the spaced apart inboard ends of the housings and out through a circumferential slot in the center mount. Pistons are axially movable within each of the housings toward and away from opposite ends of the shaft. Inboard of the pistons are helical drive members for converting axial movement of the pistons into relative rotational movement of the shaft and drive member connected thereto.

24 Claims, 4 Drawing Sheets

CENTER MOUNTED AND CENTER DRIVE HELICAL SPLINE ACTUATOR

BACKGROUND OF THE INVENTION

This invention relates generally, as indicated, to a center mounted and center drive helical spline actuator especially for use in controlling the movements of aircraft flight control surfaces and the like.

Helical spline actuators are generally known for their high torque output capabilities, thus making them a potentially good candidate for use as a high output positioning device for aircraft flight controls and the like. However, in order to effectively utilize such actuators for this purpose, provision should be made to minimize the effect of large aircraft structural deflections on the actuators so that the actuators will survive such deflections without causing damage to the actuators.

Also, provision should be made to minimize the amount of distortion and magnitude of stiffness imparted from the actuators to the aircraft structure in order to reduce the possibility of fatigue damage due to localized structural distortion as the aircraft wings or other aircraft structure experience their normal movements during flight and ground operations.

SUMMARY OF THE INVENTION

With the foregoing in mind, it is a principal object of this invention to provide a helical spline actuator for aircraft flight control surfaces and the like which minimizes the effect of large aircraft structural deflections on such actuator.

Another object is to provide such an actuator which minimizes the distortion and magnitude of stiffness imparted from the actuator to the aircraft structure.

In accordance with one aspect of the invention, the actuator includes a balanced double piston arrangement which operate in line to create equal and opposite axial forces that cancel each other, whereby such axial forces are absorbed internally. Accordingly, only the internally generated torque forces are transferred from the actuator to the stationary and control surfaces of the aircraft.

In accordance with another aspect of the invention, the actuator is desirably provided with a center mount and center drive output of minimal length which not only minimize the distortion transmitted to the stationary and control surfaces of the aircraft by the reaction torques produced within the actuator itself, but also minimize the effect of large aircraft structural deflections on the actuator.

Further in accordance with the invention, the center mount and center drive output for the actuator are desirably located substantially in line with each other to accommodate the in-line aircraft structural main supports.

To the accomplishment of the foregoing and related ends, the invention, then, comprises the features hereinafter fully described and particularly pointed out in the claims, the following description and annexed drawings setting forth in detail a certain illustrative embodiment of the invention, this being indicative, however, of but one of the various ways in which the principles of the invention may be employed.

DETAILED DESCRIPTION OF THE PREFERRED EMBODIMENT

Figure 1:
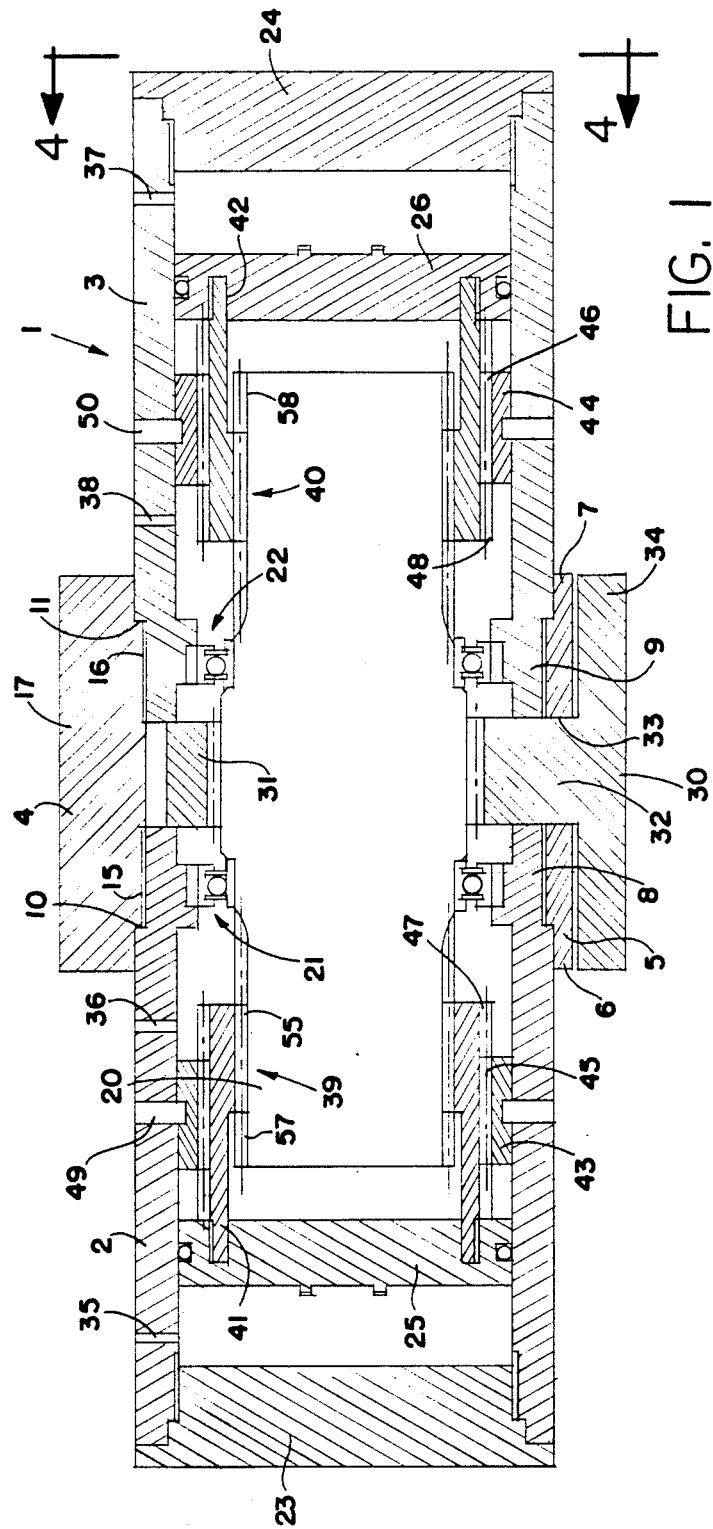
FIG. 1 is a schematic longitudinal sectional view through a preferred form of helical spline actuator in accordance with this invention shown in a neutral position.

Referring now in detail to the drawings, and initially to FIG. 1, there is schematically shown a preferred form of helical spline actuator 1 in accordance with this invention. Such actuator is preferably of a symmetrical design including a pair of outer cylinder housings 2, 3 connected together in end-to-end aligned relationship by means of a center mounting bracket 4 including an axial hub portion 5 having opposite ends 6, 7 overlapping the inboard ends 8, 9 of the cylinder housings. Preferably, such cylinder housing ends 8, 9 are externally stepped to provide shoulders 10,11 for engagement by correspondingly stepped bores 15, 16 in opposite ends of the axial hub portion 5 which maintain the cylinder housings in a desired spaced apart relation, for a purpose to be subsequently described. The center mounting bracket 4 may be secured to the cylinder housings 2, 3 in any suitable manner, for example, by welding the ends of the hub portion 5 to the housing ends.

On one side of the hub portion 5 is an enlarged mounting surface 17 to facilitate the center mounting of the actuator to a suitable support structure such as the relatively fixed structure of an aircraft substantially centrally of the length of the actuator.

Extending coaxially between the cylinder housings 2, 3 is a center shaft 20. The center shaft 20 is mounted for relative rotation within both housings as by means of suitable bearings 21, 22 mounted within the inboard ends of the respective cylinder housings.

The outboard ends of the cylinder housings 2, 3 are closed as by means of end caps 23, 24. Slidably received within the housings 2, 3 between the end caps 23, 24 and outboard ends of the shaft 20 are respective pistons 25, 26 which when simultaneously moved toward and away from each other cause the shaft 20 to rotate in opposite directions in a manner to be subsequently described.

Figure 4:
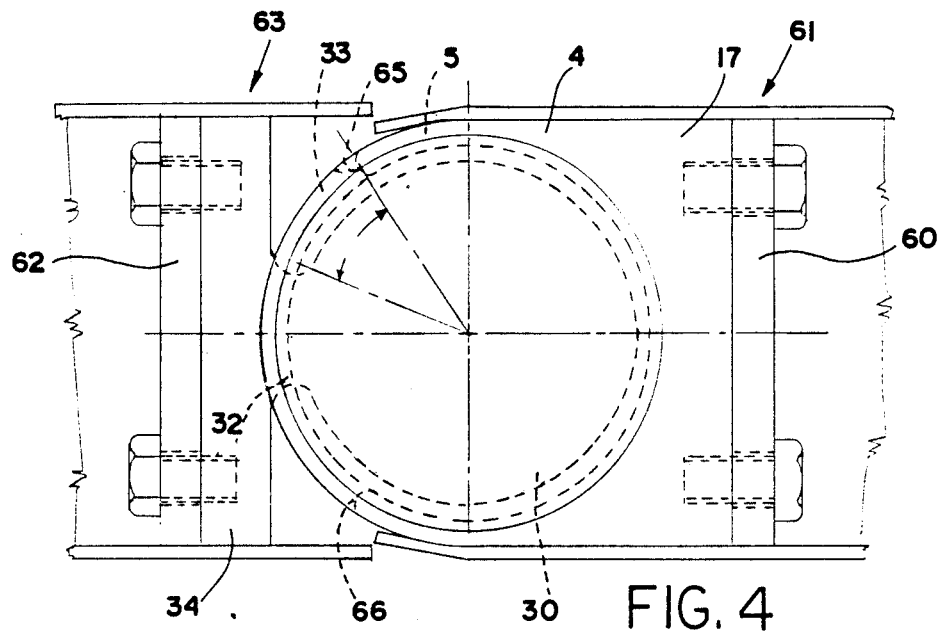
FIG. 4 is a schematic end view of the actuator of FIG. 1 as seen from the right end thereof, showing a typical mounting of a flight control surface to aircraft structure utilizing such actuator, the actuator being shown in the neutral position of FIG. 1 for maintaining the control surface in alignment with the aircraft structure.
Figure 5:
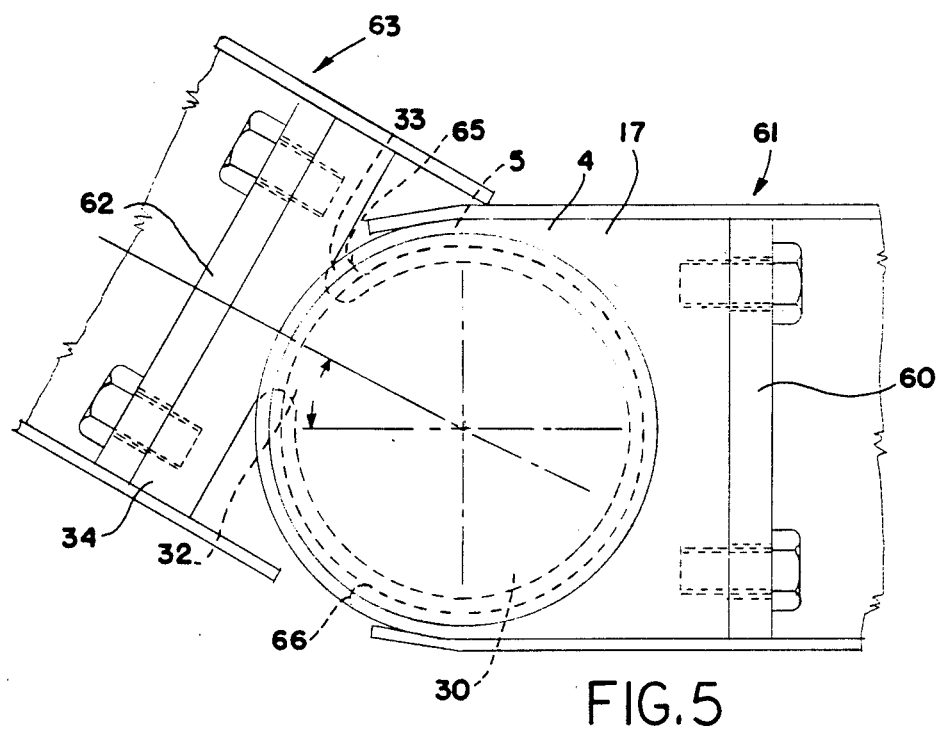
FIG. 5 is a schematic end view of the actuator similar to FIG. 4 but showing the control surface rotated in a clockwise direction relative to the aircraft structure which occurs during stroking of the actuator pistons axially inwardly from the neutral position shown in FIG. 1 to the position shown in FIG. 3.

The rotary output from the center shaft 20 is preferably transmitted exteriorly of the actuator 1 by means of a center drive member 30 which includes a center hub portion 31 keyed or otherwise drivingly connected to the shaft intermediate the ends thereof and a radial arm 32 extending radially outwardly from the hub portion between the spaced apart inboard ends 8, 9 of the cylinder housings 2, 3 and out through a circumferential slot 33 in the side of the mounting bracket 4 opposite the mounting surface 17 (see FIGS. 4 and 5 in addition to FIG. 1). AT the outermost end of the radial arm 32 is a mounting plate 34 for use in attaching the center drive member 30 to an aircraft control surface or other part to be actuated.

Suitable fluid ports 35, 36 and 37, 38 may be provided in the respective cylinder housings 2, 3 on opposite sides of the respective pistons 25, 26 for simultaneously pressurizing the outboard ends of the cylinder housings and venting the inboard ends or vice versa to cause the pistons 25, 26 to move simultaneously toward or away from each other. Axial movement of the respective pistons 25, 26 is translated into rotary movement of the drive shaft 20 by providing spline assemblies 39, 40 therebetween.

In the preferred form of the invention disclosed herein, piston sleeves 41, 42 extend axially inwardly from the respective pistons 25, 26 into a clearance space between the cylinder housings 2, 3 and the respective ends of the rotatable shaft 20. On the inner wall of the cylinder housings 2, 3 are respective annular rings 43, 44, each having internal helical splines 45, 46 thereon in meshing engagement with external helical splines 47, 48 on the respective piston sleeves. The internal spline rings 43, 44 may be secured to the respective cylinder housings 2, 3 as by means of torque transmission pins 49, 50, whereby axial movement of the pistons 25, 26 also causes the pistons and associated piston sleeves 41, 42 to rotate.

In addition to the external splines on the piston sleeves, such piston sleeves are also provided with internal splines 55, 56 in meshing engagement with external helical splines 57, 58 on the ends of the drive shaft 20. The splines 55–58 are also desirably helical and of opposite hand to the splines 45–48, whereby both axial and rotational movement of the respective pistons is translated into further rotational movement of the drive shaft.

The amount of angular rotation of the drive shaft 20 resulting from axial movement of the pistons 25, 26 is a direct function of the helix angles and direction of the two sets of splines 45–48 and 55–58. Although such helix angles may vary within certain limits, in a typical installation, the outermost set of splines 45–48 desirably have both a helix angle and pressure angle of approximately 30° and a pitch diameter of approximately 2.68 inches. The net result is that if the pistons 25, 26 are simultaneously stroked outwardly approximately one-half inch from the netural position shown in FIG. 1 to the position shown in FIG. 2, both pistons and associated piston sleeves will rotate in a counterclockwise direction of approximately 13° as viewed from the respective end caps 23, 24 toward the center mount 4 if the splines are lefthand splines.

Figure 2:
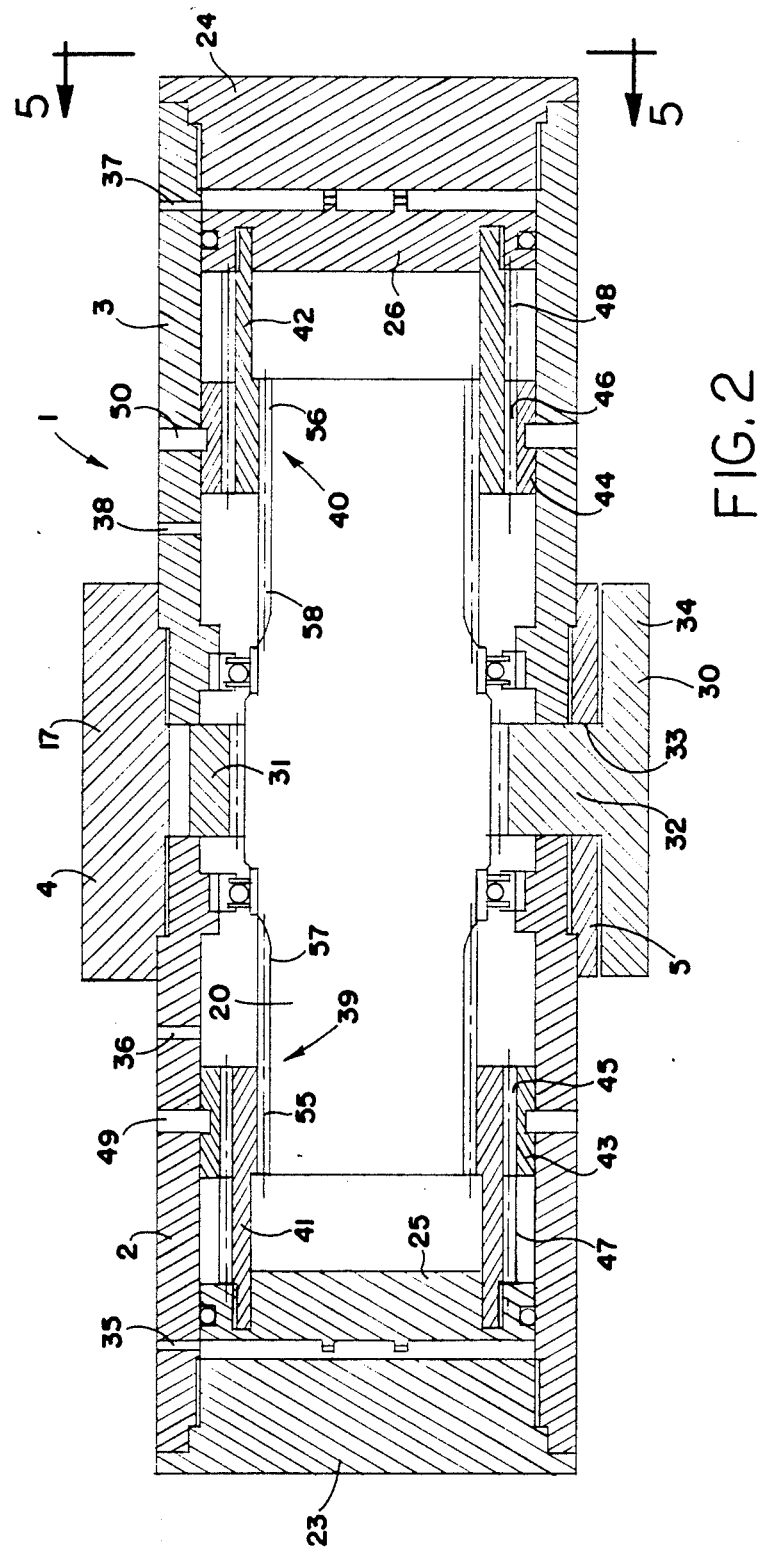
FIG. 2 is a schematic longitudinal section view through the actuator, similar to FIG. 1, but showing the pistons and double spline assemblies shifted outwardly from the neutral position.

The innermost set of splines 55–58 may also have a helix angle and pressure angle of approximately 30°, with a pitch diameter of approximately two inches, whereby the same outward stroke of both pistons from the FIG. 1 position to the FIG. 2 position will cause the shaft 20 to rotate approximately an additional 17° in the same direction for a total rotation of approximately 30° if the innermost set of helical splines are righthand splines as viewed from the respective end caps toward the center mount. Stroking of the pistons in the reverse direction (i.e., from the neutral position shown in FIG. 1 axially inwardly to the position shown in FIG. 3) will cause the shaft to rotate approximately the same amount, but in the reverse direction.

Of course, if the helix angles of the two sets of splines 45–48 and 55–58 were different, the amount of rotation produced by each set of splines during axial movement of the pistons would be different. Likewise, if the hands of the two sets of helical splines were in the same direction rather than in opposite directions, the shaft 20 could be made to rotate less.

Figure 3:
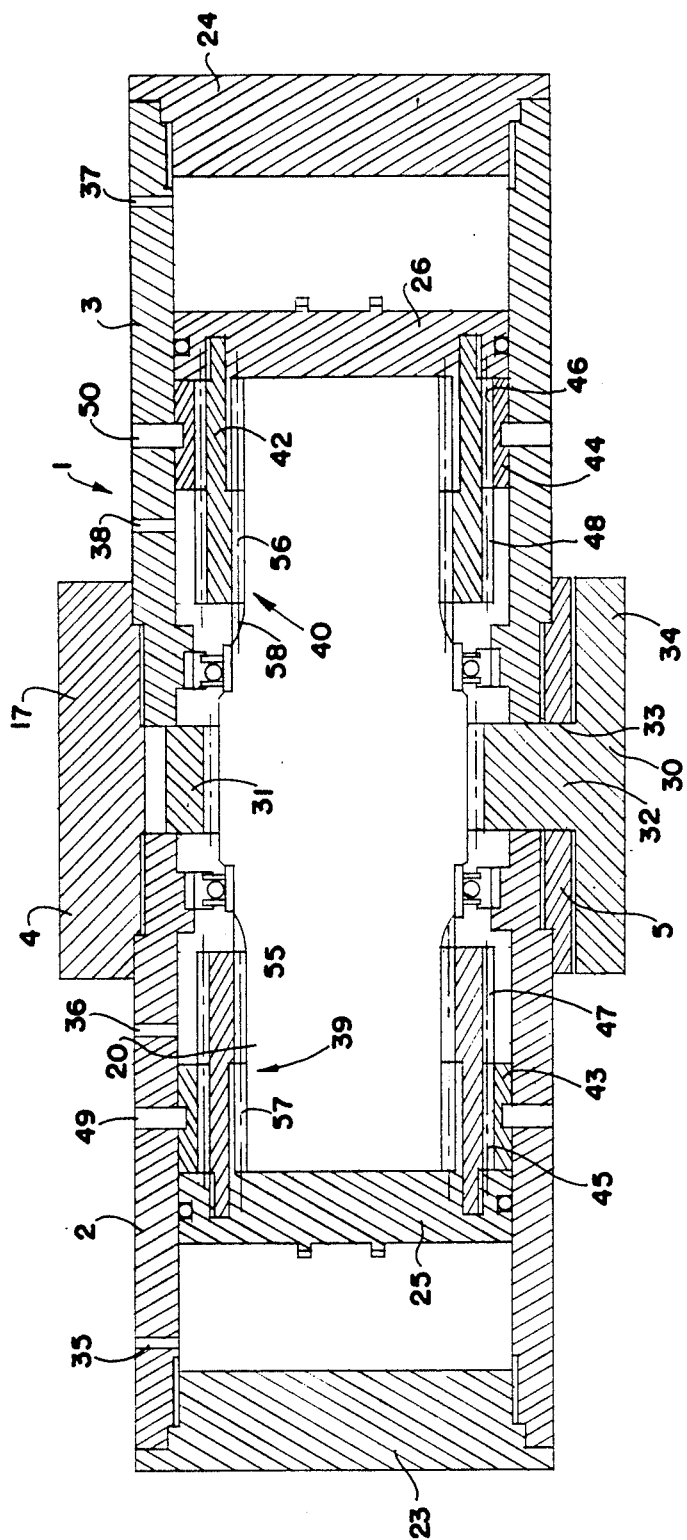
FIG. 3 is a schematic longitudinal section view through the actuator also similar to FIG. 1, but showing the actuator pistons shifted inwardly from the neutral position.

FIGS. 4 and 5 schematically illustrate a typical mounting for the actuator of FIGS. 1–3 as viewed from the end cap 24 looking toward the center mount 4. As shown, the center mounting surface 17 may be bolted or otherwise secured to a suitable load supporting beam 60 on an aircraft structure 61, whereas the center mounting plate 34 on the center drive member 30 may similarly be bolted or otherwise secured to a suitable load support beam 62 on a flight control surface 63. In FIG. 4, the center drive member 30 is shown in the neutral position with the flight control surface 63 in line with the aircraft structure 61, whereas in FIG. 5 the center drive member 30 is shown rotated 30° in a clockwise direction as viewed in FIG. 5 which occurs during stroking of the pistons inwardly from the FIG. 1 position to the FIG. 3 position. The ends 65, 66 of the circumferential slot 32 in the hub portion 5 of the center mount 4 may be used as stops limiting the amount of angular rotation of the control surface 63 relative to the aircraft structure 61.

Locating the center mounting bracket 4 and center drive member 30 in substantial radial alignment with each other as shown in FIGS. 1–3 has the advantage of accommodating the in-line aircraft structural main supports. Also, the balanced loading which results from the symmetrical design of the actuator 1 creates equal and opposite internal axial forces that cancel each other internally. This has the advantage that none of the internally generated axial forces are transferred to the aircraft structure or other mounting surface.

Because substantially all of the axially generated forces are absorbed internally, only the internally generated torque acts on the stationary and control surfaces of the aircraft through the respective center mounting bracket and center drive member. When dual forces are applied to the actuator pistons 25, 26, the helical splines 45–48 and 55–58 cause the shaft 20 and thus the center drive member 30 to rotate, which in turn moves the aircraft control surface 63. The reacting torque is transmitted through the outermost set of splines 45–48 to the outer cylinder housings 2, 3 through the torque transmission pins 49, 50 and thus into the center mounting bracket 4 which is held stationary by the aircraft structure 61 as aforesaid. Because of manufacturing tolerances, different stiffnesses, and friction and the like, the reaction torque produced by each side of the actuator when dual forces are applied to the pistons are differing, whereby differing torques enter the center mounting bracket 4 from each side, thus imparting a rotational distortion or twist to the center mounting bracket and consequently to the aircraft structure. However, since the distance across the center mounting bracket 4 is relatively small in relation to the overall length of the actuator 1, the distortion that is transmitted to the aircraft structure is minimized. Likewise, because the distance across the center drive member 30 is relatively small (such distance being shown approximately equal to the distance across the center mounting bracket), the distortion transmitted to the aircraft control surface 63 by the center drive member 30 is similarly minimized.

By minimizing the length of contact between the actuator center mount 4 and center drive member 30 and respective aircraft structures 61 and 63 to which they are connected, the magnitude of stiffness imparted from the actuator 1 to the aircraft structures is minimized, thus reducing the chances of fatigue damage to the aircraft structures due to localized structural distortion as the aircraft wing experiences its normal movements during flight and ground operations. In like manner, the aircraft structural deflections have a minimal effect on the actuator 1 because of the centralized mounting of the actuator to the respective stationary and control surfaces 61 and 63 of the aircraft. This is especially advantageous, since the aircraft structural deflections are generally much larger than the internally induced deflections within the actuator. Minimizing the effect of such deflections on the actuator allows the actuator to survive such large aircraft structural deflections without causing damage to the actuator.

From the foregoing, it will now be apparent that the helical spline actuator of the present invention is of a unique design which combines balanced loading with center mounting and center drive output to minimize actuator distortion so that the actuator can survive large aircraft structural deflections without causing damage to the actuator. The center mounting and center drive output also have the advantage that the piston seals are not subjected to torsional, bending and aircraft loads, resulting in longer seal life and reduced chances of seal leakage.

Also, because the pistons and associated seals are located outboard of the helical splines in the respective cylinder housings, the splines can be located closer to the center mounting bracket to improve stiffness while reducing torsional wind-up in the cylinder housings. The end result is that the actuator can be made lighter without sacrificing strength.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the claims.

What is claimed is:

1. An actuator comprising a pair of cylinder housings connected together in end-to-end aligned relationship, a shaft having opposite ends extending into respective inboard ends of said cylinder housings, means mounting said shaft interiorly within said cylinder housings for rotation relative to said cylinder housings, piston means simultaneously axially movable within said cylinder housings toward and away from each other and the respective ends of said shaft, means for converting axial movement of said piston means into rotational movement of said shaft, and a drive member connected to said shaft interiorly within said cylinder housings intermediate the ends of said shaft for rotation therewith, said drive member extending outwardly from said shaft exteriorly of said cylinder housings intermediate the ends of said actuator.

2. The actuator of claim 1 wherein said means mounting said shaft for rotation comprises bearing means within each of said housings for supporting the ends of said shaft for rotation within said housings.

3. The actuator of claim 1 further comprising center mount means for said actuator directly connecting said inboard ends of said housings together exteriorly of said housings.

4. The actuator of claim 3 further comprising a circumferential slot in said center mount means, said drive member extending through said slot exteriorly of said housings.

5. The actuator of claim 4 wherein said center mount means includes means for attaching said actuator to a relatively stationary support intermediate said inboard ends of said housings, and said drive member includes means for attachment to a movable member.

6. The actuator of claim 3 wherein said center mount means includes an axial hub portion exteriorly of said housings connecting the inboard ends of said housings together in spaced apart end-to-end relation.

7. The actuator of claim 6 wherein said drive member extends radially outwardly from the interior of said housings between the inboard ends of said housings and through a slot in said center mount means.

8. The actuator of claim 7 wherein the ends of said slot in said center mount means act as stops limiting the amount of rotation of said drive member relative to said housings.

9. The actuator of claim 1 wherein said means for converting axial movement of said piston means into rotational movement of said shaft comprises helical drive means.

10. The actuator of claim 1 wherein said means for converting comprises first spline means between the respective housings and piston means, and second spline means between said piston means and the respective ends of said shaft, at least one of said first and second spline means being helical.

11. The actuator of claim 10 wherein both said first and second spline means are helical.

12. The actuator of claim 11 wherein the helix of said first and second spline means are of opposite hand.

13. The actuator of claim 1 further comprising a center mount for said actuator intermediate the ends thereof, and said means for converting comprises separate helical drive means within each of said housings inboard of the respective piston means.

14. The actuator of claim 13 further comprising piston sleevs extending from the respective piston means between said cylinder housings and the respective ends of said shaft, and said helical drive means comprises first spline means between said housings and the exterior of said piston sleeves, and second spline means between the interior of said piston sleeves and the respective ends of said shaft.

15. The actuator of claim 14 further comprising an annular ring attached to the interior of each of said cylinder housings, said first spline means comprising internal splines on each said annular ring in meshing engagement with external splines on said piston sleeves.

16. The actuator of claim 14 wherein said second spline means comprises internal splines on said piston sleeves in meshing engagement with external splines on the respective ends of said shaft.

17. The actuator of claim 14 wherein said first spline means are helical splines.

18. The actuator of claim 14 wherein said second spline means are helical splines.

19. The actuator of claim 14 wherein said first and second splines means are helical splines of opposite hand.

20. An actuator comprising a pair of cylinder housings having inboard ends connected together in aligned end-to-end relationship, a shaft having opposite ends extending into the respective inboard ends of said housings, means mounting said shaft interiorly within said housings for relative rotation within said housings, piston means simultaneously axially movable within said housings toward and away from each other and the respective ends of said shaft, means for converting axial movement of said piston means into rotational movement of said shaft, and a center mount for said actuator intermediate the ends thereof, said means for converting comprising helical drive means within the respective housings inboard of said piston means.

21. The actuator of claim 20 further comprising piston sleeves extending from the respective piston means coaxially between said housings and the respective ends of said shaft, said helical drive means comprising first spline means between said housings and the exterior of said piston sleeves, and second spline means between the interior of said piston sleeves and the respective ends of said shaft.

22. The actuator of claim 21 wherein said center mount comprises an axial hub portion, said inboard ends of said housings being fixed within the ends of said hub portion in axially spaced apart relation from each other.

23. The actuator of claim 22 further comprising a rotatable drive member connected to said shaft intermediate the ends of said shaft for rotation therewith, said drive member extending between the inboard ends of said housings exteriorly of said housings through a slot in said center mount.

24. The actuator of claim 23 wherein the ends of said slot limit the amount of rotation of said drive member relative to said housings.

* * * * *